United States Patent [19]

Schaefer et al.

[11] E Patent Number: Re. 31,964

[45] Reissued Date of Patent: Aug. 6, 1985

[54] AUTOMATIC DEVELOPMENT ELECTRODE BIAS CONTROL SYSTEM

[75] Inventors: Louis F. Schaefer, Palo Alto; Kenneth W. Gardiner, Menlo Park, both of Calif.

[73] Assignee: Savin Corporation, Stamford, Conn.

[21] Appl. No.: 507,958

[22] Filed: Jun. 27, 1983

Related U.S. Patent Documents

Reissue of:

[64] Patent No.: 3,892,481
Issued: Jul. 1, 1975
Appl. No.: 479,659
Filed: Jun. 17, 1974

U.S. Applications:

[63] Continuation of Ser. No. 811,460, Jun. 29, 1977, abandoned.

[51] Int. Cl.[3] ..... G03G 9/04

[52] U.S. Cl. ..... 355/10; 355/140; 118/708; 324/72

[58] Field of Search ..... 355/10, 14 D, 3 R, 3 DD; 430/119; 118/647-650, 668, 677, 708; 324/72

[56] References Cited

U.S. PATENT DOCUMENTS

| | | | |
|---|---|---|---|
| 2,944,147 | 7/1960 | Bolton | 355/15 X |
| 2,956,487 | 10/1960 | Giaimo | 355/14 |
| 3,411,482 | 11/1968 | Brodie | 118/637 |
| 3,575,505 | 4/1971 | Parmigiani | 355/14 D |
| 3,576,623 | 4/1971 | Snelling | 355/10 X |
| 3,577,259 | 5/1971 | Sato | 117/37 |
| 3,611,982 | 10/1971 | Coriale | 118/637 |
| 3,654,893 | 4/1972 | Piper et al. | 118/637 |
| 3,674,532 | 7/1972 | Morse | 118/647 X |
| 3,679,453 | 7/1972 | Katagiri et al. | 118/647 X |
| 3,779,204 | 12/1973 | Altmann | 118/647 |
| 3,782,818 | 11/1974 | Smith | 355/10 |
| 3,788,739 | 1/1974 | Coriale | 355/3 DD |
| 3,805,739 | 4/1974 | Feldeisen et al. | 355/14 D |
| 3,815,988 | 6/1974 | McVeigh et al. | 355/3 R |
| 3,835,380 | 9/1974 | Webb | 324/72 |
| 3,949,703 | 4/1976 | Smith et al. | 355/10 X |

*Primary Examiner*—R. L. Moses
*Attorney, Agent, or Firm*—Shenier & O'Connor

[57] ABSTRACT

An automatic control system for the bias on a development electrode in which a plurality of ground-insulated, narrow floating electrodes are spaced along a line adjacent the entrance of a liquid developer applicator unit. The floating electrodes relatively scan image areas of the surface of an organic photoconductor carried by a conductive support moving through the developer unit. Owing to conduction of a charge from the photoconductive surface through the developer liquid to the floating electrodes, they assume potentials each of which is a function of the average potential of the image area subtended by the floating electrode. The potential of each floating electrode is sensed by a high input impedance measuring circuit which selects the potential of the lowest value, amplifies the selected potential and applies the amplified voltage to the biasing electrode or electrodes of the developer system.

A fully charged and unexposed area of the surface following the image area produces a reverse bias which cleans the biasing electrodes as the fully charged area passes through the developer system.

42 Claims, 3 Drawing Figures

AUTOMATIC DEVELOPMENT ELECTRODE BIAS CONTROL SYSTEM

Matter enclosed in heavy brackets [ ] appears in the original patent but forms no part of this reissue specification; matter printed in italics indicates the additions made by reissue.

BACKGROUND OF THE INVENTION

*This application is a continuation of reissue application Ser. No. 811,460 filed June 29, 1977, now abandoned, which is a reissue of U.S. Pat. No. 3,892,481.*

In the art of electrostatic copying in which the surface of a photoconductor carried by a conductor support first is charged, then exposed to a light image and then subjected to the action of a developer, organic photoconductors have recently come into relatively wide use. While photoconductors of this type have many advantages over inorganic photoconductors, they have one significant disadvantage. Upon exposure to light the charge on the photoconductor does not leak off as rapidly as is desirable. Thus, in any copying apparatus which is to operate at a reasonable rate of speed, an organic photoconductor retains a significant charge in background or non-image areas after normal exposure to the copy to be reproduced. This background level may be in the range of from about 100 to about 200 volts.

Many attempts have been made in the prior art to overcome the problem of deposit of developer upon background areas owing to the residual potential thereon. For example, it has been suggested that the developer station be provided with a biasing electrode to which a potential is applied to counteract the effect of the residual potential in background areas. One problem in using a fixed biasing potential is that the background potential varies over a relatively wide range so that either development of background areas takes place if the biasing potential is not large enough or toner is deposited on the biasing electrode if too large a biasing potential is employed. It will be appreciated further that a biasing potential should be applied to the electrode only during the period of time during which the latent image is passing through the developer system. If the biasing potential is not switched off, relatively great amounts of toner will be deposited on the biasing electrode when uncharged areas of the drum pass through the developer station.

Attempts have been made in the prior art to provide systems which vary the biasing potential in response to variations in the potential of background areas. For example, Coriale U.S. Pat. No. 3,611,982 shows an arrangement in which a capacitive probe, located outside and just before the developer unit, is exposed by a shutter to a charged and fully exposed strip at the edge of the photoconductor drum. The sensed potential is amplified and is used to control a variable power source which provides the biasing potential of the electrode located in the developer system. Another example of a bias voltage control system is shown in Coriale U.S. Pat. No. 3,788,739, in which a capacitive probe, located outside and just ahead of the developer system, senses the potential of a part of an oversize exposed area outside the image area to control the bias potential applied to an electrode in the developer unit. A further example of the use of a capacitive probe to regulate the bias applied by a source to a biasing electrode is shown in Smith U.S. Pat. No. 3,782,818. The probe of Smith, like those of Coriale, is located just ahead of and outside of the developer applicator unit in which the biasing electrode is disposed. Parmigiani U.S. Pat. No. 3,575,505 shows an arrangement in which the developer system bias voltage is changed in response to the number of copies made in an attempt to compensate for changes in the characteristics of the photoconductor over a period of time.

The systems of the prior art discussed hereinabove sense photoconductor voltage by the use of delicate and sensitive instruments such as electrometers for measuring the charge in residual areas of the photoconductor. Such instruments are not only expensive, but also involve critical factors such as the particular geometry of the probe and the critical distance of the probe from the surface carrying the potential to be sensed. The arrangements of the prior art, moreover, employ switching arrangements for rendering the bias effective only for the period of time during which the image passes through the developer system. In addition, owing to the deposition of toner particles on the biasing electrode, unless some means is provided for cleaning this electrode, it will rapidly become so contaminated as to render the system inoperative.

We have invented an automatic development electrode bias control system for inhibiting deposit of toner on background areas which overcomes the defects of systems of the prior art. The parameters of our system are non-critical. Our assembly is relatively inexpensive to contruct. Our construction is such as to insure that the bias will at all times be sufficient to prevent deposition of toner on background areas. We provide our system with automatic means for removing toner deposited on the biasing electrode without the use of mechanical cleaning means.

SUMMARY OF THE INVENTION

One object of our invention is to provide an automatic development electrode bias control system.

Another object of our invention is to provide a system for overcoming the effect of background potential which avoids the defects of systems of the prior art intended to achieve this purpose.

Another object of our invention is to provide an automatic development electrode bias control system the parameters of which are not critical.

Another object of our invention is to provide for automatic exposure control by the automatic bias control to permit high quality copies to be made from both white and colored background originals without requiring operator adjustment.

A still further object of our invention is to provide an automatic development electrode bias control system which is relatively inexpensive to manufacture.

A still further object of our invention is to provide an automatic development electrode bias control system having means for removing toner particles from the biasing electrode without the use of mechanical cleaning means.

Other and further objects of our invention will appear from the following description.

In general our invention contemplates the provision of an automatic development electrode biasing control system for an electrostatic copying machine using a liquid developer in which a plurality of narrow sensing electrodes are spaced along a line in the developer unit adjacent to the entrance thereof. These electrodes afford a measure of the average potential along the image areas subtended by the electrodes owing to conduction of a small portion of the charge on the photoconductive surface through the developer liquid disposed between and in contact with both the surface and with the electrode. The voltages thus sensed are measured by a high input impedance measuring circuit, which selects the potential of lowest value, and amplifies it to provide the biasing voltage for application to the biasing electrodes. We provide the photoconductive surface with a fully charged and unexposed region following the image area to provide a reverse bias which draws toner particles which have been deposited on the biasing electrode in the course of a developing operation from the biasing electrode.

BRIEF DESCRIPTION OF THE DRAWINGS

In the accompanying drawings to which reference is made in the accompanying specification and in which like reference characters indicate like parts in the various views:

FIG. 3 is a schematic view of one form of an electrical circuit which may be employed in our automatic development electrode bias control system.

DESCRIPTION OF THE PREFERRED EMBODIMENT

Figure 1:
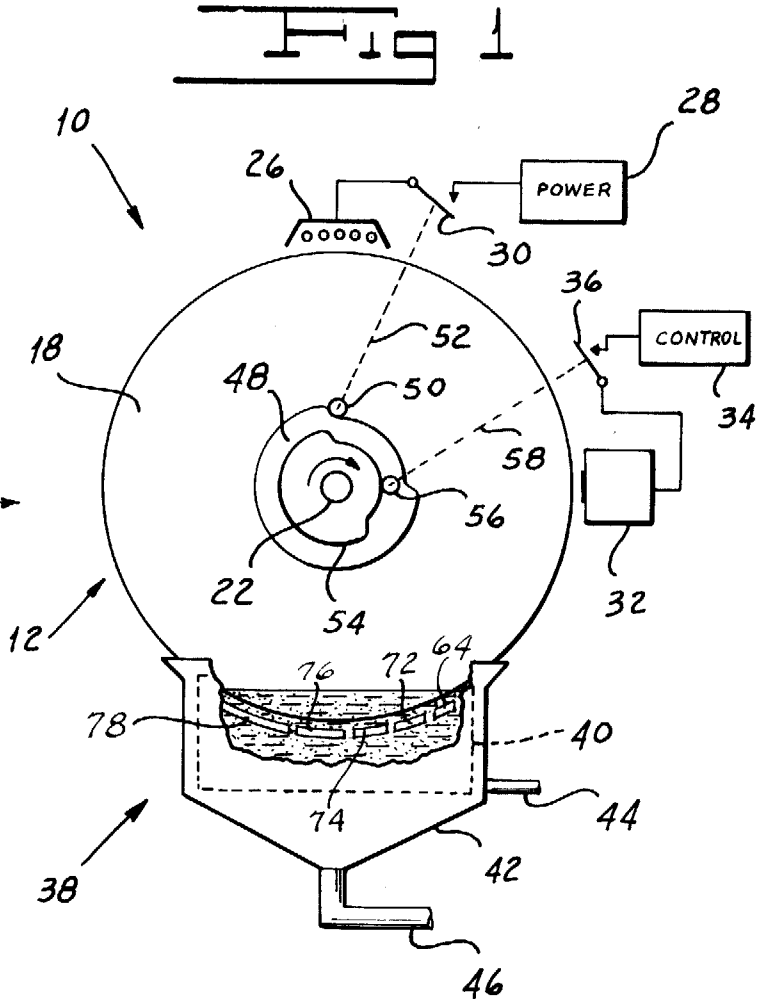
FIG. 1 is a partially schematic end elevation of an electrostatic copying machine which may be provided with our automatic development electrode bias control system.
Figure 2:
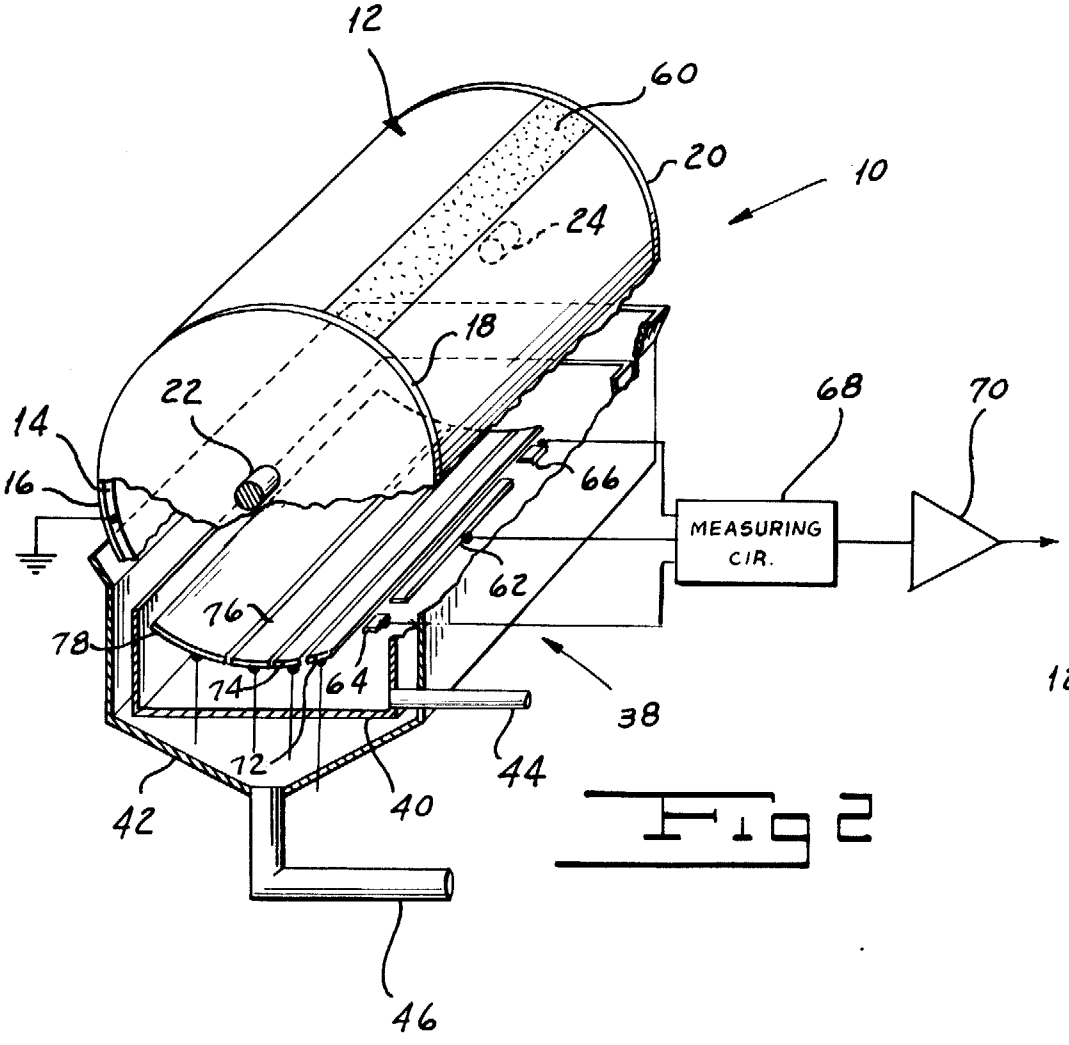
FIG. 2 is a perspective view with parts removed, with other parts broken away, and with parts shown in section, illustrating our automatic developmen electrode bias control system.
Figure 5:
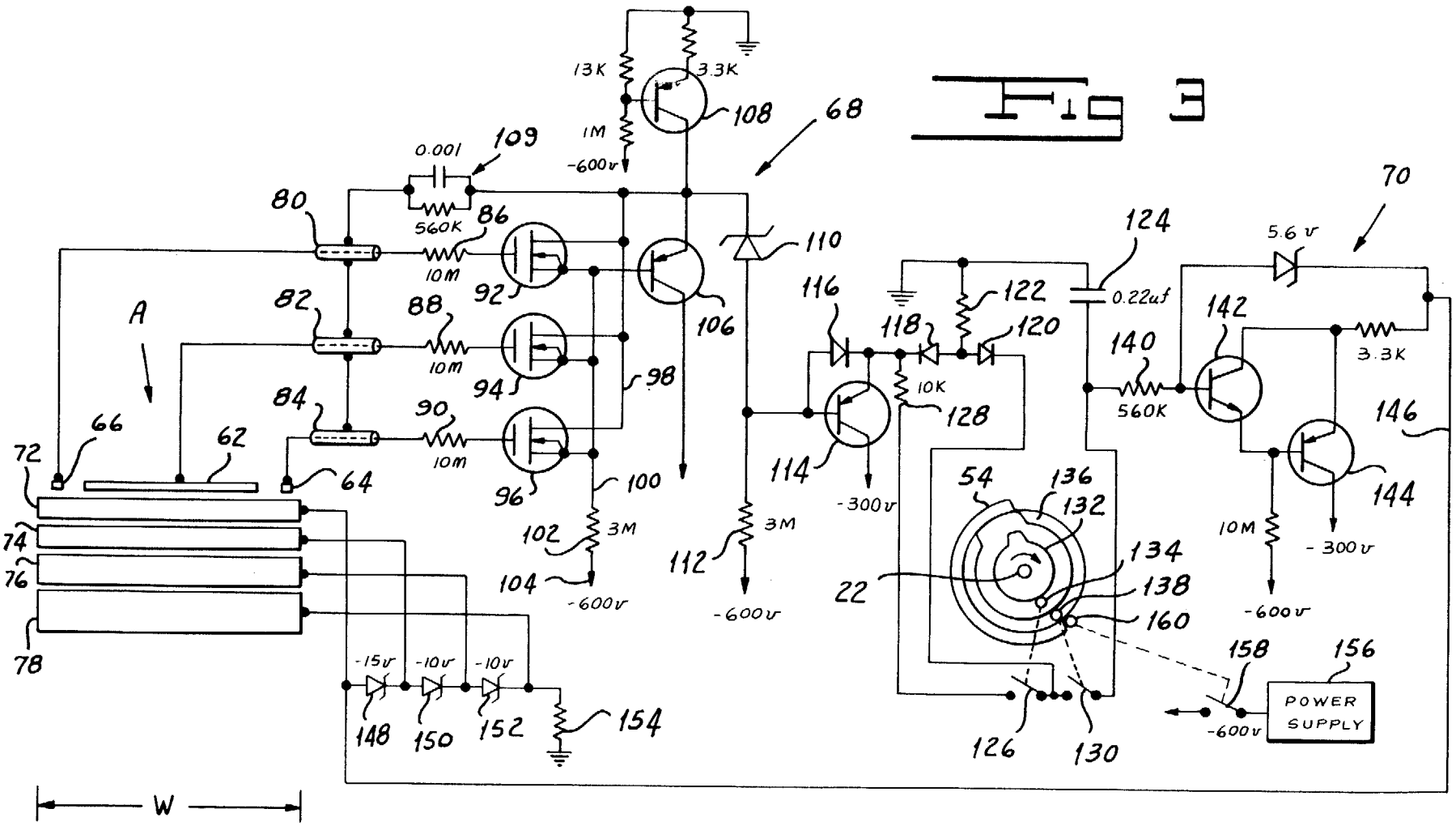

Referring now to FIGS. 1 and 2, a machine indicated generally by the reference character 10, with which our system may be used, includes a drum indicated generally by the reference character 12 made up of a conductive cylinder 14, the outer surface of which carries a layer 16 of organic photoconductive material well known to the art. Drum 12 includes respective end plates 18 and 20 carrying stub shafts 22 and 24 by means of which the drum is mounted for rotary movement in a manner known to the art.

A corona discharge unit 26 is adapted to be connected to a suitable source of power 28 through a switch 30 to provide a corona discharge for applying a uniform electrostatic charge to the photoconductor 16 as the drum 12 rotates. After having been charged, the photoconductive surface moves past an exposure unit 32 of any type known to the art, adapted to be connected to a control unit 34 upon the closure of a switch 36.

After having been exposed to an original of the image to be copied, the photoconductive surface moves into cooperative relationship with a developer unit indicated generally by the reference character 38. Developer unit 38 may, for example, be of the type which includes an applicator tank 40 disposed within a return tray 42. As is known in the art, developer made up of charged toner particles disposed in a carrier liquid having a relatively high volume resistivity is fed into the tank 40 through a pipe 44. The tank 40 fills to a point at which the liquid developer comes into contact with the surface of the drum 12 and then overflows into the tray 42, from whence it is returned to the supply (not shown) through a pipe 46.

It will readily be appreciated that any means may be employed to control the operation of the various units of the machine 10. For reasons which will be explained more fully hereinbelow, we wish to provide a region on the photoconductive surface 16 following the image area, which region is fully charged but not exposed. By way of example, in order to achieve this result we may mount a cam 48 on shaft 22 for rotation therewith, so as to actuate a follower 50 to close switch 30 so that a predetermined region around the drum is fully charged. A second cam 54 on shaft 22 is adapted to operate a follower 56 to close switch 36 to place the exposure unit 32 into operation. It will be seen from FIG. 1 that the angular extent of the cam 48 is greater than that of cam 54, so that a greater region of the surface layer 16 is charged than is exposed. Moreover, the arrangement is such that exposure starts at the beginning of the charged region, so that the fully charged and unexposed region 60 follows the image in the direction of movement of the drum. It will further be appreciated by those skilled in the art that such an arrangement could, if desired, readily be adapted to a system in which the controls are so set as to permit of the making of copies of different lengths.

In our automatic development electrode bias control system, we dispose a small centrally located electrode 62, and edge electrodes 64 and 66 of conductive material in the developer tank 40 adjacent to the entrance thereof. We so locate the electrodes 62, 64 and 66 as to insure that the image area on the drum passes over the electrodes as the image area moves through the developer unit 38. Moreover, the electrodes 62, 64 and 66 are so located that developer liquid flows between the electrodes and the drum and contacts the surfaces of both the electrodes and the drum. Our electrodes 62, 64 and 66 are completely insulated from ground or "floating" so that they are permitted to assume their own potentials. When developer is disposed between and contacting both surfaces of the electrodes and of the drum, charged toner particles are attracted to the surface of the photoconductor resulting in charges on the electrodes 62, 64 and 66 such that each electrode assumes a potential which is a measure of that of an area on the surface of layer 16. The resistance of the toner is high but not a complete insulator. In the particular orientation shown, each electrode 62, 64 and 66 will assume a potential which is a measure of the average potential over that portion of the image area which registers with the electrode. The potential the electrode assumes is nearly independent of the electrode-to-photoconductor spacing owing to conductive interconnection by the toner liquid. It is also reasonably independent of the electrode capacity-to-ground and resistive capacity-to-ground, providing that the capacities are small and that the resistances are fairly high. It will thus be seen that our sensing electrodes 62, 64 and 66 operate on the principle of conduction, rather than capacitance.

In order to utilize the potentials sensed by electrodes 62, 64 and 66, we connect the electrodes to a high input impedance measuring circuit 68 which selects as its output the lowest potential sensed. An amplifier 70, which receives its input from the measuring circuit 68 applies a biasing potential to biasing electrodes 72, 74, 76 and 78 in a manner to be described. The average voltage of each electrode 62, 64 and 66 over the image area being sensed thereby will be equal to the residual or background poential in clear areas with no printing and greater than the residual potential in areas with printing.

As indicated in FIG. 3 each of the development electrodes 72, 74, 76 and 78 extends across substantially the entire width W of a copy to be produced. Moreover, dimensioning of the sensing electrodes 62, 64 and 66 and the positioning thereof across the width of the copy to be produced are so selected that the electrode 62 scans the central portion of the image which normally corresponds to that part of the original, such as a typewritten page, which contains printing, while the electrodes 64 and 66 scan areas corresponding to margin or border areas of the original which normally are devoid of printing. By virtue of this arrangement of multiple electrodes, one on each edge and one in the middle of the image area, we are able to, and our circuit [78] *68* does, select the biasing voltage from the sensing electrode having the lowest reading. Since, as is pointed out hereinabove, most originals include one or more clear border areas, our arrangement ensures that a minimum bias is provided for most copies. Our circuit 68 also permits of the insertion of a small additional bias to the development electrode to provide an overall bias which is slightly greater than the potential value sensed in a clear area, thus ensuring that no development will take place in the background areas. In the course of our investigation, we discovered that the resistance of the liquid developer between a sensing electrode and the drum is of the order of $10^9$ ohms. Our high impedance measuring circuit 68 has an input impedance of more than $10^{12}$ ohms, or at least three orders of magnitude greater than the resistance between the electrode and the drum surface. In this way we are able to obtain a good reading of the average potential along the region of the image area in registry with the electrodes 62.

When the fully charged and unexposed area 60 of the drum 12 arrives at the developer unit at a location in registry with the biasing electrodes, the high potential of this area produces a reverse bias. It will readily be appreciated that, even with the amplifier 70 putting out its deliberately limited maximum value, the potential of the development electrodes will be well below that of the unexposed area 60. Consequently, toner particles which may have been deposited on the biasing electrodes in the course of the developing operation, are drawn toward the surface of the drum. In the course of that operation, many of the developer particles return to suspension in the carrier liquid. It is, of course, true that the area 60 will be to some extent developed by the toner particles. This does not present a serious problem in most commercial applications, however, since such units are provided with mechanical means for cleaning the surface of the photoconductor 16 in the course of each operation of the machine.

Alternatively to providing the fully charged and unexposed region for cleaning the biasing electrodes, we may provide a section of the drum with a thin plastic coating rather than a conductor, or we may switch a reverse polarity voltage onto the development electrodes during passage of non-image areas of the drum through the developer system.

Referring now to FIG. 3, we have shown one example of a high input impedance measuring circuit indicated generally by the reference character 68, including a sample-and-hold portion to be described hereinbelow and an amplifier indicated generally by the reference character 70, which we may employ in our automatic developer electrode bias control system. In the arrangement shown, we provide respective shields 80, 82 and 84 for the conductors leading from the sensing electrodes 66, 62 and 64. Respective resistors 86, 88 and 90 connect the sensing electrodes 66, 62 and 64 to insulated gate field effect transistors 92, 94 and 96 having a common drain line 98 and a common source line 100 connected by a resistor 102 to the terminal 104 of a source of potential having a value of, for example, −600 volts. The high input impedance of the measuring circuit 68 is provided by the transistors 92, 94 and 96. These transistors, in response to the sensed voltages, serve to shunt current away from the base emitter junction of a transistor 106. The common source line 100, which is connected to the base of transistor 106, supplies the base current for the transistor through the resistor 102. A transistor 108 forms a current source for providing the emitter current for transistor 106. Owing to this arrangement, the emitter of transistor 106 normally is a few volts more positive than the input to the field effect transistors 92, 94 and 96, assuming that all of these transistors were fed from the same source. As a matter of fact, however, as is indicated in FIG. 3, the field effect transistors 92, 94 and 96 are fed with input voltages from the respective sensing eletrodes 66, 62 and 64. In the arrangement shown, the circuit responds to the least negative of the sensed voltages ignoring the other sensed voltages. It will readily be apparent that the least negative voltage is produced on the probe which is sensing the most discharged area of the photoconductor which normally would be in the margin of the original. A parallel RC circuit, indicated generally by the reference character 109, couples the emitter of transistor 106 to the shields 80, 82 and 84, so that the capacitance between the input conductor and the shield does not load the sensing electrode. The negative voltage source of the sensing circuit is a Zener diode 110 connected to the source of −600 volts by a resistor 112.

Our measuring circuit 68 includes a sample-and-hold circuit which is responsive to the potential at the common terminal of diode 110 and resistor 112. This signal is applied to the base of a transistor 114 which base is connected to the emitter by means of a diode 116. The collector of transistor 114 is connected to a source of, for example, −300 volts. The transistor 114 forms a low impedance driver which is adapted to apply a potential to a storage capacitor 124. The sample-and-hold circuit includes back-to-back diodes 118 and 120, the common terminal of which is connected to ground and to one terminal of the storage capacitor 124 by a resistor 122. A pair of microswitches 126 and 130 are adapted to be closed to control the charging of the capacitor 124. A resistor 128 connects one terminal of switch 126 to the common terminal of diodes 116 and 118. We connect the common terminal of the two switches 126 and 130 to the diode 120. The other terminal of switch 130 is connected to capacitor 124. From the circuit it can be seen that with switch 126 closed transistor 114 is permitted to charge the storage capacitor 124 very rapidly in either direction. Operation of microswitch 130 with switch 126 open permits the capacitor to charge only in the positive direction.

We so arrange our circuit that switch 126 is closed during the first 2 or 3 centimeters of the copy image and switch 130 is closed for about the first twelve centimeters of the copy image. In order to achieve this result, we may, for example, mount a first cam 132 on shaft 22 for rotation therewith. A follower 134, positioned at a location around shaft 22 corresponding to that at which the latent image is entering the developer system 38, is adapted to be actuated by the cam 132 to close switch 126 and to hold the switch closed for approximately 2 to 3 centimeters of the copy. Another cam 136 on shaft 22 is adapted to actuate a follower 138 located at a position corresponding to that of follower 134 to close switch 130 for approximately the first twelve centimeters of the copy length. Thus, during the first 2 to 3 centimeters of the image, transistor 114 is permitted to charge capacitor 124 rapidly in either direction. During the next portion of the copy image up to approximately 12 centimeters, transistor 114 can charge capacitor 124 only in the positive direction and at a controlled charging rate which is a compromise among a number of factors.

A resistor 140 applies the stored voltage to the amplifier 70, which is made up of a pair of transistors 142 and 144, to provide the development electrode biasing voltage on a conductor 146. We apply the voltage on line 146 to the various development electrodes 72, 74, 76 and 78 by means of a string of diodes 148, 150, 152 and a resistor 154, all connected in series between the line 146 and ground. In the arrangement shown, the electrode 72, which is the first electrode adjacent to which the copy passes as it moves through the developer system, receives the full biasing potential. The second electrode 74 receives the potential at the common terminal of diodes 148 and 150. Electrode 76 receives the potential at the common terminal of diodes 150 and 152, while the last development electrode 78 receives the potential at the common terminal of diode 152 and resistor 154.

It is desirable that no voltage be applied to the development electrodes during times when no development is to take place, in order to prevent excessive deposit of toner on the development electrodes. This result may be accomplished in any convenient manner. For example, as we have indicated schematically in FIG. 3, the power supply 156, which supplies the −600 volt potential and the −300 bolt potential to various points in the circuit, may be disconnected from the sensing circuit by any convenient means. By way of example, we have indicated a switch 158 in the output line of supply 156. A cam follower 160 is adapted to be operated to close switch 158 to apply power to the sensing circuit. Follower 160 may be operated in any convenient manner. For example, we may position the follower 160 in line with followers 134 and 138 and at a position at which it is actuated by the exposure cam 54 which will cause switch 158 to be closed all during the period of time when the latent image is passing through the developer system. It will readily be appreciated that any other suitable means might be employed to control the application of power to the sensing circuit.

In operation of our automatic development electrode bias control system, when the machine 10 is set in operation, drum 12 rotates in the direction of the arrows shown in FIGS. 1 and 2. Cam 48 actuates follower 50 to apply power from the source 28 to the corona 26 so that the surface of layer 16 receives a uniform charge over the period of time for which the cam 48 actuates the follower 50. After the drum has rotated to a point at which the leading edge of the charged area is adjacent to the optical system 32, cam 54 actuates follower 56 to close switch 36 to connect the control arrangement 34 to the optical system 32 to begin the exposure step. This exposure step lasts for the extent of cam 54 so that, as can be seen from FIG. 1, there is a fully charged but unexposed area 60 following the image area. As the image area enters the developer system 38, cam 54 closes switch 158 to apply power to the sensing circuit 68. As the image passes electrodes 62, 64 and 66, the electrodes sense the potentials of areas of the image covered thereby. The sensing circuit selects the least negative of the potentials which is sampled and held. The resultant signal is amplified and applied to the development electrodes 72, 74, 76 and 78. It will readily be appreciated that this potential will be equal to or somewhat greater than the actual residual potential in background areas of the image so that we ensure that no development of these background areas takes place.

It will further be appreciated, as is pointed out hereinabove, that in the course of this development operation some toner particles will collect on the biasing electrodes. However, as the area 60 moves over the development electrodes, there is produced a reverse bias owing to the fact that the fully charged but unexposed area 60 is at a much greater potential than the maximum biasing potential provided by the circuit including amplifier 70. This reverse bias causes toner to migrate from the development electrodes 64 and 66 toward the surface of the drum. In the course of this operation some of the toner particles coming off the electrodes will go back into suspension in the developer carrier liquid. It is true that, in the course of this operation, the area 60 will be developed at least to some extent. As is further pointed out hereinabove, however, this presents no great problem in a commercial machine, since some means already is provided for cleaning the surface of the drum 12 on each operation of the machine.

It will be seen that we have accomplished the objects of our invention. We have provided an automatic development electrode biasing control system. Our biasing system overcomes the defects of systems of the prior art intended to inhibit background development. Our system provides a variable bias which produces the effect of automatic exposure control. The parameters of our system are not critical. We provide our system with means for cleaning the biasing electrodes without the necessity of employing mechanical cleaners. Our system is appreciably less expensive than are systems of the prior art employing instruments such as electrometers.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A system for automatically controlling the biasing potential on a developer electrode in an electrostatic copying machine including in combination, a support, a surface layer of photoconductive material on said support adapted to receive a latent electrostatic image to be developed, a developer unit for contacting developer fluid with said image to develop the same, a biasing electrode in said developer unit, a sensing electrode insulated from ground, means mounting said sensing electrode in said developer unit at a location at which developer fluid is positioned between and in contact with both said photoconductive surface and said sensing electrode to enable said sensing electrode to assume substantially the potential on said surface by conduction, and means responsive to the potential of said sensing electrode for applying a biasing potential to said biasing electrode.

2. A system as in claim 1 in which said sensing electrode mounting means mounts said sensing electrode at a location at which it registers with a portion of said image in the course of a developing operation.

3. A system as in claim 2 including means mounting said support and said developer unit for relative movement, and in which said sensing electrode mounting means positions said electrode adjacent to the point at which said image enters said developer unit.

4. A system as in claim 1 in which said developer is a liquid developer made up of charged particles suspended in a liquid having a high electrical resistance.

5. A system as in claim 4 in which said developer between said surface and said sensing electrode and said photoconductor has a certain high resistance and in which said means responsive to the potential sensed by said sensing electrode includes a measuring circuit having an input resistance which is orders of magnitude greater than said resistance.

6. A system as in claim 1 in which said biasing potential is greater than the potential in background areas of said image.

7. A system as in claim 1 including means for producing a reverse bias between said surface and said biasing electrode in the course of operation of said machine.

8. A system as in claim 7 in which said reverse bias producing means comprises means for producing a charged unexposed area on said surface outside the area of said image.

9. A system as in claim 8 including means for moving said support and said developer unit relative to each other and in which said charged unexposed area trails said image area in the direction of said relative movement.

10. A system as in claim 1 in which said photoconductor is an organic photoconductor.

11. A system as in claim 1 in which said sensing electrode is an electrically floating electrode.

12. Apparatus for developing a latent electrostatic image carried by the surface of a photoconductor including in combination, a developer applicator unit for applying developer to said surface, said applicator unit having an entry and an exit, means for moving said surface and said developer applicator unit relative to each other to carry said image through said unit in a direction from said entry toward said exit, a biasing electrode in said developer unit, an electrically floating sensing electrode of conductive material, means mounting said sensing electrode in said developer unit at a location at which developer passes between said sensing electrode and said surface to cause said electrode to sense the potential of said surface by virtue of conduction through said developer, said developer between said sensing electrode and said surface having a certain resistance, and means including a measuring circuit having an input impedance orders of magnitude greater than said resistance and responsive to said potential sensed by said sensing electrode for applying a biasing potential to said biasing electrode.

13. Apparatus as in claim 12 in which said sensing electrode is positioned at a location at which a portion of the image area of said surface registers with said sensing electrode as said image area moves through said unit.

14. Apparatus as in claim 12 including means for producing a reverse bias between said biasing electrode and said surface following a developing operation.

15. Apparatus as in claim 14 in which said means for producing said reverse bias comprises means for producing a reverse field between the development electrode and an area on said surface outside the area of said image.

16. Apparatus as in claim 15 in which said photoconductive is an organic photoconductor and in which said developer is made up of charged particles suspended in a liquid having a high resistance.

17. Apparatus as in claim 12 in which said sensing electrode is adjacent to the entry of said developer unit and in which said measuring circuit comprises a storage capacitor, means responsive to movement of an initial portion of an image into said developer unit for enabling bidirectional charging of said capacitor in response to a sensed potential, means responsive to movement of an intermediate portion of said image into said developer unit for enabling only unidirectional charging of said capacitor in response to sensed potential and means responsive to entry of the remainder of said image into said delivery unit for disabling charging of said capacitor.

18. Apparatus as in claim 12 in which said means including said measuring circuit comprises a source of power for said circuit and means for disconnecting said source from said circuit as non-image areas of said surface pass through said developer unit.

19. Apparatus for developing a latent electrostatic image carried by the surface of a photoconductor including in combination, a developer applicator unit for applying developer to said surface, said applicator unit having an entry and an exit, means for moving said surface and said developer applicator unit relative to each other to carry said image through said unit in a direction from said entry toward said exit, a developer electrode in said unit, a plurality of electrically floating sensing electrodes of conductive material, means mounting said sensing electrodes along a line extending generally across the direction of relative movement of said surface and said unit and at a location at which developer passes between said sensing electrodes and said surface to cause said sensing electrodes to sense the potential of said surface in areas thereof adjacent to said electrodes by virtue of conduction through the developer and means responsive to the potential sensed by said sensing electrodes for applying a potential to said development electrode.

20. Apparatus as in claim 19 in which said plurality of sensing electrodes includes a central electrode adapted to scan the portion of the image corresponding to the central normally printed area of an original and an edge electrode adapted to scan the portion of the image corresponding to a normally unprinted border area of an original.

21. Apparatus as in claim 19 in which said means responsive to the potential sensed by said sensing electrodes comprises means for selecting the potential of the lowest magnitude sensed by said sensing electrodes.

22. Apparatus as in claim 19 in which said plurality of sensing electrodes includes a central electrode adapted to scan the portion of the image corresponding to the normally printed area of an original and an edge electrode adapted to scan a portion of the image corresponding to a normally unprinted border area of an original, and in which said means responsive to the potential sensed by said sensing electrode comprises means for selecting the sensed potential of the lowest magnitude.

23. Apparatus as in claim 19 including a plurality of development electrodes spaced in the direction of relative movement of said surface and said unit, and means for applying said biasing potential to said development electrodes in decreasing steps from the first development electrode to the last development electrode in said direction of relative movement.

24. Apparatus as in claim 19 in which said line along which said electrodes are disposed is adjacent to the entry of said developer unit.

25. Apparatus as in claim 24 in which said means responsive to said potential sensed by said sensing electrodes comprises a storage capacitor, means responsive to movement of an initial portion of an image into said developer unit for enabling bidirectional charging of said capacitor in response to a sensed potential, means responsive to movement of an intermediate portion of said image into said developer unit for enabling only unidirectional charging of said capacitor in response to sensed potential and means responsive to entry of the remainder of said image into said developer unit for disabling charging of said capacitor.

26. Apparatus as in claim 19 in which said means responsive to said potential sensed by said sensing electrodes comprises a sensing circuit, a source of power for said sensing circuit and means for disconnecting said source from said circuit as non-image areas of said surface pass through said developer unit.

*27. In an electrophotographic copying apparatus comprising a movable member having a photosensitive surface and adapted to be moved along a predetermined path during which said surface is subject to charging, exposing to an image of an original to be copied to form an electrostatic latent image of the original thereon, developing of the latent image with a developing agent having toner, transfer printing of the developed image into copy sheets, and cleaning of residual toner thereon, the improvement comprising:*

*a. a plurality of developing electrodes disposed along the path of movement of said surface in opposing relation thereto at a developing station,*

*b. means for supplying the developing agent between said electrodes and said surface,*

*c. voltage source means for providing a constant voltage source for said electrodes,*

*d. means for distributing the supplied voltage from said source means to said respective electrodes in a graded manner which substantially conforms to that of a reference damping characteristic of potential on said surface along the path of movement thereof at the developing station, and*

*e. means for varying the values of voltages applied to said respective electrodes without influence to said graded manner therebetween in accordance with the value of potential of an electrostatic latent image on said surface to be developed.*

*28. An improvement as in claim 27 wherein said distributing means comprises constant voltage diodes connected in series to each other and between said constant voltage source and ground and having junctions therebetween connected to said respective electrodes.*

*29. An improvement as in claim 28 wherein said varying means comprises a pair of variable voltage dropping means each means each connected between the series of said diodes and said control voltage source and said ground respectively.*

*30. An improvement as in claim 27 further comprising means for setting a portion to be unexposed on said photosensitive surface to maintain the unexposed portion at a high potential, whereby removing toner placed on said electrodes therefrom by the attraction of the high potential portion.*

*31. An electrophotographic copying apparatus comprising a movable member having a photosensitive surface, an electrostatic charger adjacent said member and located along the path of motion of said member, for imparting an electrostatic charge to said surface, an exposure unit adjacent said member and spaced away from said charger in the direction of motion of said member, having means to impart an electrostatic image to said surface, developer means adjacent said member and spaced away from said exposure unit in the direction of motion of said member, said developer means having a reservoir containing a developing agent which is attractable to said electrostatic image and forms a visual image corresponding to said electrostatic image on said surface, means for moving a copy sheet into pressing engagement with said member spaced away from said developer means in the direction of motion of said member, cleaning means adjacent said member and spaced away from said moving means in the direction of motion of said member, for cleaning away the developing agent from said surface, and a constant light source adjacent said member and spaced away from said cleaning means in the direction of motion of said member, for discharging said electrostatic charge by exposing said surface to light, said developer means comprising a plurality of electrodes spaced away from and facing said surface and disposed along the path of said surface, voltage course means connected to said electrodes for providing a constant voltage to said electrodes, pump means within said reservoir for supplying developing agent from said reservoir to the space between said electrodes and said surface, grading means connected to said electrodes for distributing the supplied voltage from said source means to said electrodes in a manner substantially conforming to the damping characteristic of the said electrostatic charge on said surface as said surface passes said electrodes, and varying means connected between said voltage source means and said grading means to change the voltage applied to said electrodes in accordance with the value of said electrostatic image, without influencing the graded relationship between said electrodes.*

*32. A copying apparatus according to claim 31, wherein said grading means comprises a plurality of constant voltage diodes connected in series to each other and having junctions therebetween connected to said electrodes.*

*33. A copying apparatus according to claim 31, wherein said photosensitive surface has a portion charged by said charger and unexposed to light, thus forming a high potential area situated on said surface behind said electrostatic image, switching means connected to said electrodes and to said moving member to cut the voltage supply from said voltage source means to said electrodes at the time when said high potential area passes said electrodes, the difference in potential causing any excess developing agent left on said electrodes after said visual image forming to be electrostatically attracted to said high potential area.*

*34. A method of electrically biasing a developing electrode disposed closely adjacent to a photoconductive member of an electrophotographic device after the photoconductive member has been charged and exposed to a light image, comprising the steps of:*

*a. automatically sensing the potential remaining at a plurality of respective portions of the photoconductive*

*member and automatically selecting the lowest value of the sensed potential; and*

*b. automatically applying biasing voltage to the developing electrode in accordance with the lowest value of the sensed potential.*

*35. The method of claim 34, further comprising the step of:*

*c. computing the biasing voltage in accordance with the lowest value of the sensed potential between steps (a) and (b).*

*36. The method of claim 34, in which the electrophotographic device includes a reference document disposed adjacent to an original document for reproduction whereby the light image applied to the photoconductive member includes a light image of the original document and a light image of the reference document so that an electrostatic image of the reference document is produced at a predetermined portion of the photoconductive member, step (a) being characterized by automatically sensing the potential at the predetermined portion of the photoconductive member containing the electrostatic image of the reference document.*

*37. The method of claim 34, in which the developing electrode is formed in a plurality of sections, step (b) being characterized by automatically applying biasing voltages to the sections of the developing electrode which are respectively predetermined in accordance with the lowest value of the sensed potential.*

*38. The method of claim 34, in which the photoconductive member is movable relative to the developing electrode and the developing electrode is formed in sections disposed along the path of movement of the photoconductive member, step (b) being characterized by applying biasing voltages to the sections of the developing electrode which are respectively predetermined in accordance with both the lowest value of the sensed potential and the position of the respective section along the path of movement of the photoconductive member.*

*39. In an electrophotographic device having a photoconductive member, charging means for charging the photoconductive member, imaging means for radiating a light image of an original document onto the photoconductive member and a developing electrode disposed closely adjacent to the photoconductive member after the photoconductive member has been charged by the charging means and radiated with the light image by the imaging means, apparatus for electrically biasing the developing electrode comprising:*

*sensing means for automatically sensing the potential remaining on the photoconductive member at a portion thereof where the potential has a predetermined value relative to the minimum potential remaining on the photoconductive member; and*

*computing means to automatically compute the biasing voltage to be applied to the developing electrode as a predetermined function of the sensed potential and apply said biasing voltage to the developing electrode, said computing means comprising an amplifier and a switch, said switch being connected between the sensing means and the amplifier, said switch comprising a first fixed contact connected to the sensing means and a second fixed contact grounded and a movable contact connected to the amplifier.*

*40. Electrophotocopying apparatus including in combination a drum having a periphery, a photoconductive surface layer mounted on said periphery, means for rotating the drum, means effective during a first rotation angle of the drum for electrostatically charging said surface, operable means for exposing the charged surface to a pattern of light and shade, means for operating the exposing means during a second rotation angle of the drum less than said first rotation angle to produce an electrostatic image, said charged surface including a non-image region having an angular extent equal to the difference between the first and second rotation angles, means including an electrode spaced from said surface for applying to said image a developer liquid containing dispersed toner particles, rotation of said drum sequentially carrying said image and said non-image region past said electrode, and means electrically biasing said electrode during passage thereby of said image with a first potential providing adjacent said electrode a first electric field which attracts toner particles thereto, said charged non-image region providing adjacent said electrode during passage thereby of said region a second electric field which repels toner particles from said electrode and deposits toner particles on said non-image region of said surface.*

*41. Apparatus as in claim 40 further including means electrically biasing said electrode during passage thereby of said non-image region with a second potential which increases said second electric field.*

*42. Apparatus as in claim 40 further including means electrically biasing said electrode during passage thereby of said non-image region with a second potential, wherein the periphery of the drum is conductive, wherein said first potential is appreciably different from that of said periphery, and wherein said second potential is substantially equal to that of said periphery.*

* * * * *